July 22, 1930.　　F. C. WACHS ET AL　　1,771,022
VEHICLE PARKING DEVICE
Filed Jan. 25, 1929　　3 Sheets-Sheet 3
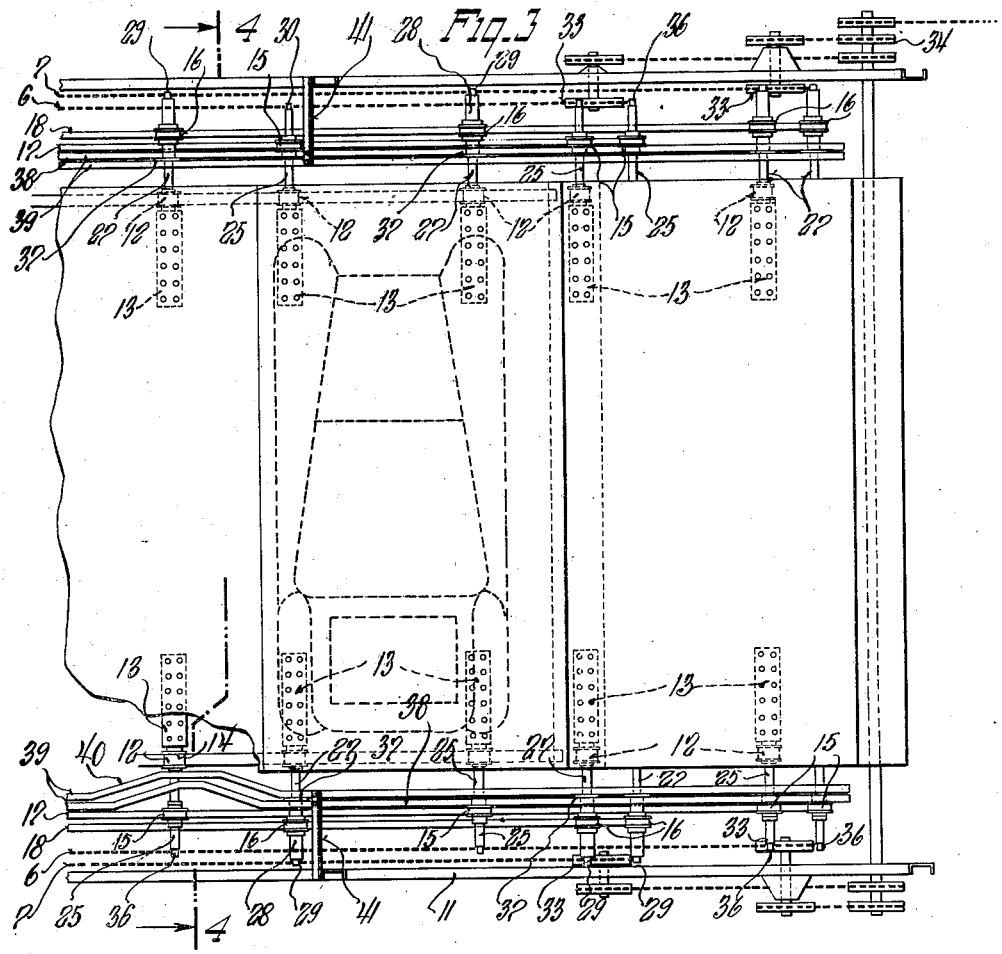
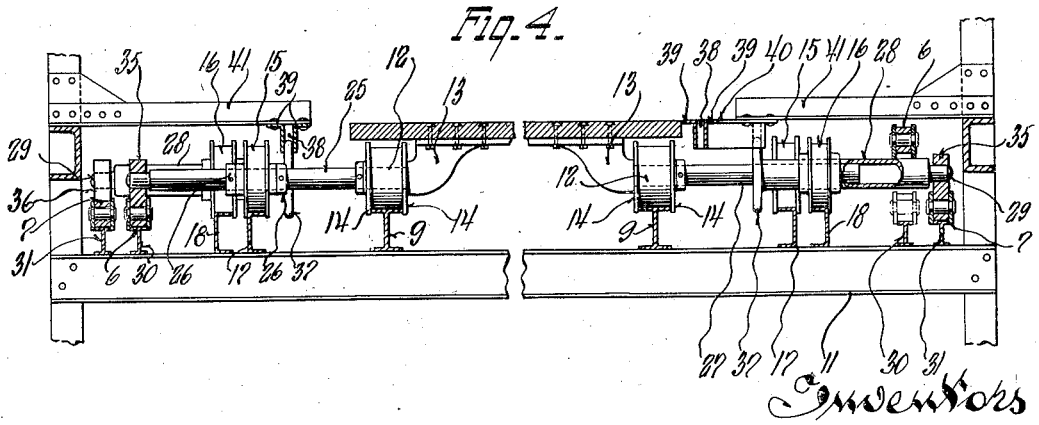
Inventors
Frank C. Wachs
Alfred E. Buerosse Patented July 22, 1930

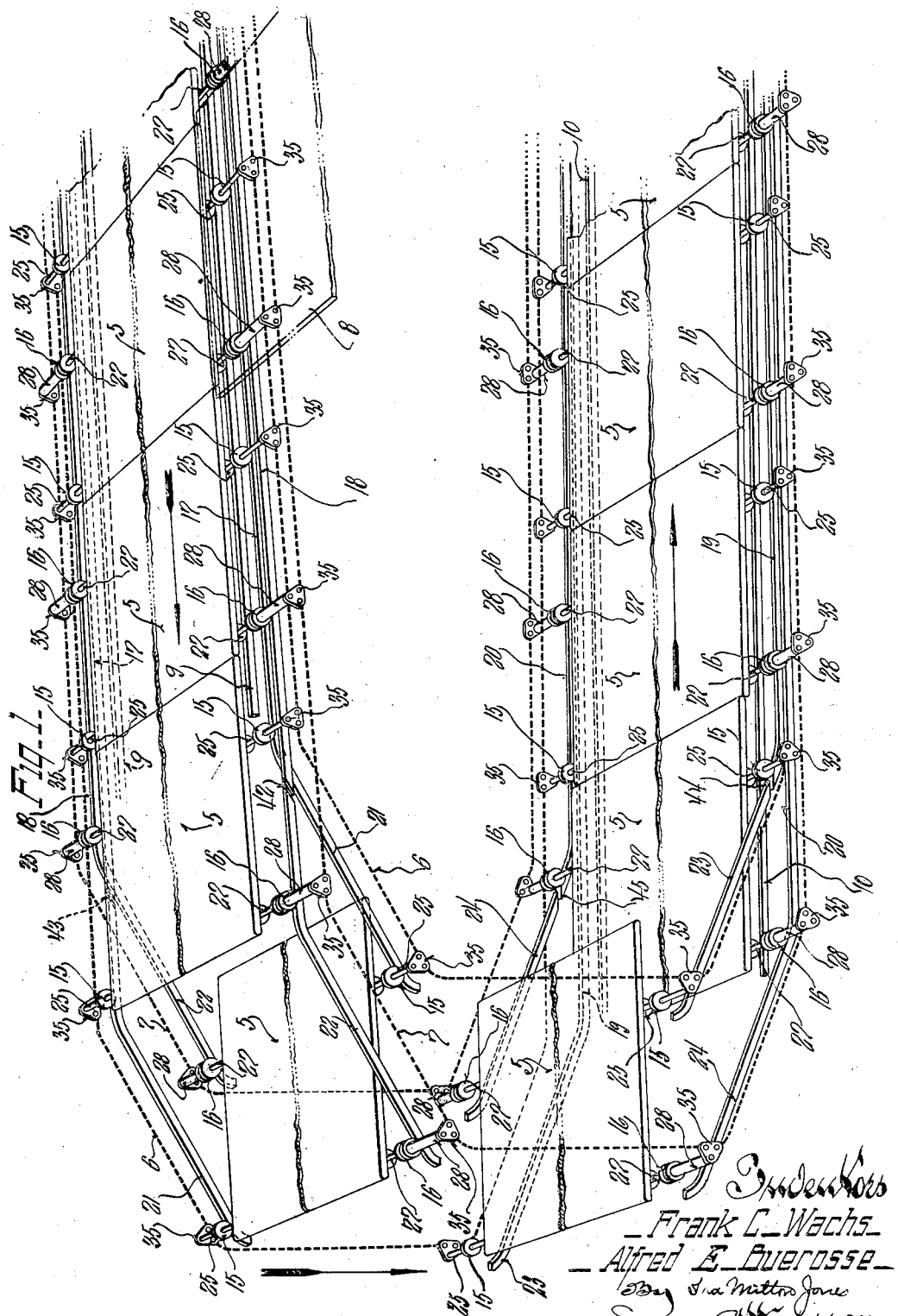

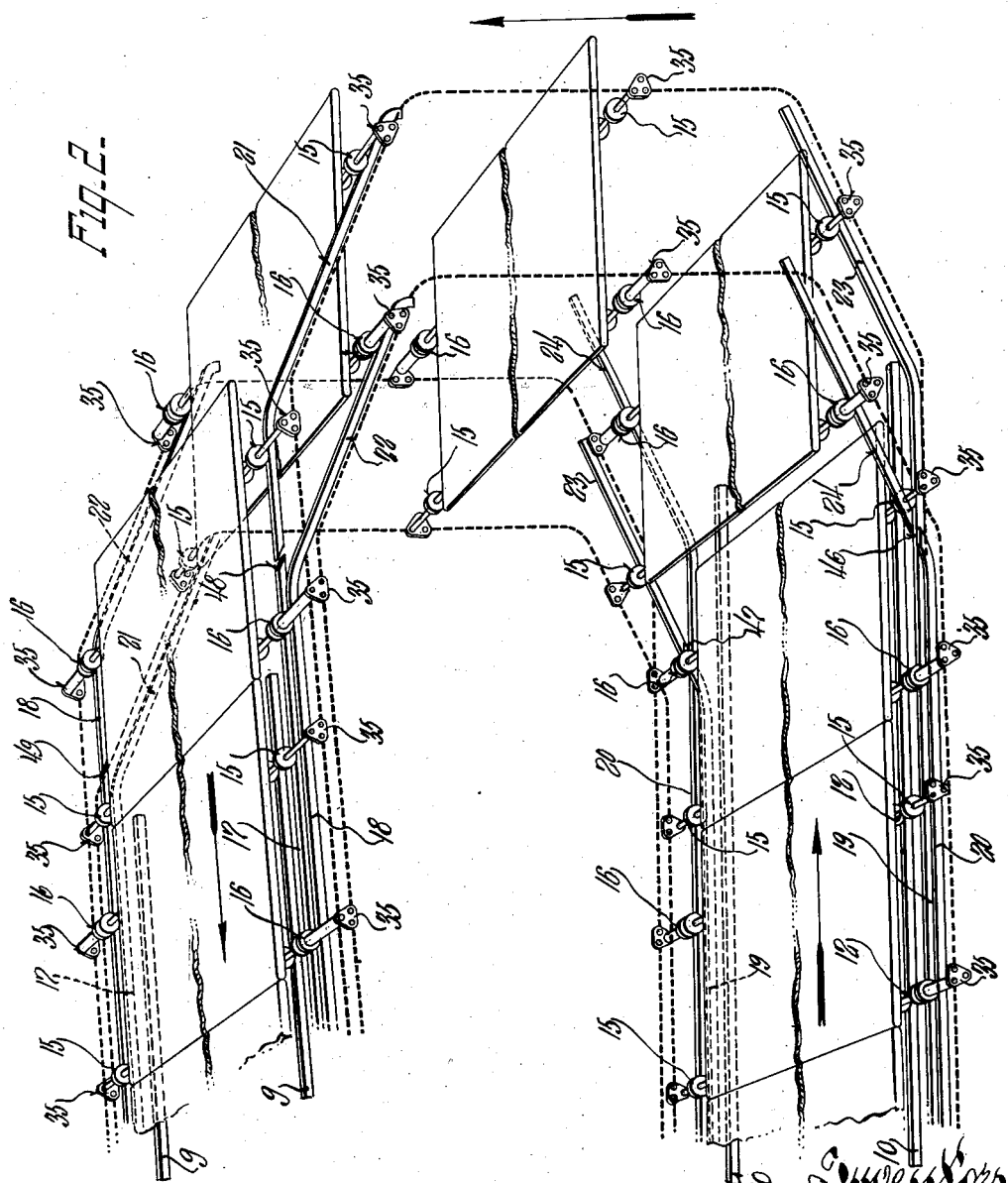

1,771,022

UNITED STATES PATENT OFFICE

FRANK C. WACHS, OF MILWAUKEE, AND ALFRED E. BUEROSSE, OF WAUWATOSA, WISCONSIN

VEHICLE PARKING DEVICE

Application filed January 25, 1929. Serial No. 335,119.

This invention relates to certain new and useful improvements in vehicle parking devices and has as one of its objects the provision of means whereby a vehicle may be readily moved from the entrance of a building to a point remote therefrom.

It is another object of this invention to provide a parking device for vehicles and the like which consists of a plurality of platforms movable past the entrance of the building in which the device is located or a suitable loading station to present successive platforms thereto.

A further object of this invention resides in the provision of a plurality of platforms adapted to receive vehicles which are carried by movable endless chains arranged in superimposed levels.

And a still further object of this invention resides in the provision of a plurality of vehicle carrying platforms movable with endless chains, over tracks arranged in superimposed levels, the tracks being inclined whereby the weight of the vehicles is utilized to aid the driving mechanism.

With the above and other objects in view which will appear as the description proceeds, our invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings we have illustrated one complete example of the physical embodiment of our invention constructed according to the best mode we have so far devised for the practical application of the principles thereof, and in which:

Figures 1 and 2 are perspective views diagrammatically illustrating our improved parking device;

Figure 3 is a top plan view of one end of the device, and

Figure 4 is an enlarged sectional view taken through Figure 3 on the plane of the line 4—4.

Referring now more particularly to the accompanying drawings in which like numerals designate like parts throughout the several views, the numerals 5 designate platforms which are operably connected with a pair of movably mounted endless chains 6 and 7 in juxtaposition at each side thereof, in a manner to be later described.

The chains 6 and 7, and consequently the platforms 5, are arranged in an upper and a lower level and the entire structure is mounted so that one of the levels is horizontally aligned with the entrance of the building with which the device is used or with a suitable loading station, shown diagrammatically as at 8, in Figure 1, so that vehicles may be driven onto the platforms as they are moved in alignment therewith. In this manner a vehicle may be driven from the loading station onto an empty platform and the chains actuated, in a manner to be later described to align the next empty platform with the loading station to receive another vehicle, etc. By aligning the upper stretch of platforms with the street level, the device affords a convenient means for utilizing the basement of the building for parking purposes.

As illustrated in Figures 1 and 2, which together diagrammatically illustrate the entire structure, the platforms while on the upper stretch or level move to the left until they reach a point adjacent the left end where they move down an incline from the end of which they are carried down vertically to the lower level. Upon reaching the lower level the platforms moved down an incline to the right and across the lower level to the opposite end of the device where they are carried up an incline and vertically to the upper level. The inclines at the ends of the device, break the abruptness of the change in direction and permit faster moving of the platforms. Both the upper and lower levels are slightly inclined toward the direction of movement so that the weight of the vehicles being carried assists the driving means, as will be readily apparent.

While traveling over the horizontal portions of the upper and lower levels the weight of the platforms is supported by tracks 9 and 10, respectively, carried by a suitably fabricated structure or framework 11 which provides a support for the entire mechanism, but as it forms no part of the invention it is not shown in detail. Wheels 12 freely journaled on bearing brackets 13 fixed to the underside of the platforms adjacent their corners, are adapted to ride on the tracks 9 and 10 and by flanges 14 formed on the wheels retain the platforms against transverse shifting during their horizontal movements.

Inasmuch as it is essential that the platforms remain horizontal during their movement over the inclined portions or ends of both upper and lower levels, it will be readily apparent that the upper tracks 9 must terminate short of the adjacent inclined ends and therefore auxiliary supporting means are provided which carry the weight of the platforms while moving over the inclined portions. This means consists of a pair of flanged freely rotatable wheels 15 and 16, on each side of the platforms, which are adapted to engage suitable tracks 17 and 18, while on the upper level and similar tracks 19 and 20 while on the lower level, respectively.

The tracks 17 and 18 are arranged in pairs at each side of the upper level with the tracks 17 innermost and with the downwardly inclined ends 21 of the tracks 17 and the similar ends 22 of the tracks 18 extended one beyond the other in parallel relation and for a reason to be later explained the inclined end 22 at the left end of the device extends beyond the adjacent inclined end 21, on one side. On the other side the order is reversed, and as the tracks 17 and 18 are of equal length, the arrangement of the projecting ends at the other end (that shown in Figure 2) is opposite to that described.

The tracks 19 and 20 which form part of the lower level are likewise arranged in pairs at opposite sides of the structure with the tracks 19 innermost and have their inclined ends 23 and 24, respectively, directed upwardly and staggered longitudinally in a similar manner. While it is only the inclined ends of the tracks 17, 18, 19 and 20 which actually support the platforms, they are continued across both levels for convenience and to provide an auxiliary support.

The rollers 15 which engage the inner tracks 17 of the upper level and the tracks 19 of the lower level are journaled on the shafts 25 of diagonally opposite bracket members 13 of each platform and are secured against longitudinal movement on the shafts by fixed collars 26. The rollers 16, however, are not mounted directly on the shafts 27 of the other diagonally opposite bracket members 13 but are freely slidably and rotatably mounted on sleeve members 28 slidable on the shafts 27, for a purpose to be later described.

The purpose of the sliding sleeves 28 upon which the rollers 16 are journaled, is to permit the driving pin 29 carried thereby to be moved inwardly of the inner chains 6 where such movement is necessary as will be later described. The chains 6 and 7 of each side are movable over suitable guide tracks 30 and 31, respectively, while in their horizontal stretches and are disposed outwardly of the tracks 18 and 20 of the upper and lower levels respectively. As will be readily apparent the chains are trained about sprockets 33 conventionally mounted from the fabricated framework 11 at the points where a change in direction of movement takes place and for the sake of clearness the sprockets are not shown in Figures 1 and 2. A suitable drive mechanism 34 diagrammatically illustrated in Figure 3, is provided to simultaneously drive all of the chains in unison.

Special links 35 carried by the chains at spaced intervals and adapted to receive the driving pins 29 of the sleeves 28 and pins 36 formed on the ends of the shafts 25 operably connect the chains with the platforms to carry them through their cycle of movement. As the chains 6 are innermost, it is possible to maintain the driving connection between them and the platforms unbroken throughout the entire cycle, but inasmuch as the chains 7 are disposed outwardly of the chains 6, it will be readily apparent that the driving connection between the platforms and the chains 7 must be broken at certain points during the cycle to permit the driving connection to pass the inner chains 6. To this end the driving pins 29 which engage the outer chains 7 are carried by the sleeves 28, which being slidable on their shafts 27, provide means whereby the pins may be readily disengaged from their respective links 35 to permit them to pass the adjacent portion of the chains 6, after which they are again engaged with the chain 7.

As it is desirable that the driving pins 29 of each platform be disengaged at different times so that three points of connection between the platforms and the driving chains are maintained at all times the position of the pins on the platforms is staggered as hereinbefore described which necessitates the staggered position of the tracks 17, 18, 19 and 20.

Referring to the forward side of the structure as illustrated in Figures 1 and 2, it will be seen that a disconnection of the driving pins 29 from the adjacent outer chain 7 must take place at the lower left hand corner and again at the upper right hand corner, and on the opposite side of the structure the driving pins 29 must be disconnected from the other chain 7 at the upper left hand corner and again at the lower right hand corner; and inasmuch as the manner in which the sleeves 28 and consequently the driving pins 29 are moved, is identical at the several places at which this movement is necessitated, only one instance is illustrated, reference being had particularly to Figures 3 and 4.

In these views, the upper right hand corner of the forward side is shown, see Figure 2. At this point the driving connection between the platforms and the adjacent chain 7, moving upwardly along the incline 22 engages the underside of the chain 6, and as the chains are traveling at the same speed, merely raises it as shown in Figure 4, until the sleeve 28 and its pin 29 is moved inwardly of the chain 6, which then drops to its normal position permitting the pin to be reengaged with its particular link.

Movement of the sleeves 28 is accomplished by the provision of a guide flange 37 formed at the inner end of each sleeve which is at all times disposed within a track 38 formed of a pair of cooperating angle iron members 39. At the points where it is desired to move the driving pins 29 inwardly of the adjacent inner chain 6, the track 37 is directed inwardly as clearly illustrated at 40 in Figures 3 and 4. Thus it will be seen that as the platforms approach the point at which the disengagement of their pins 29 is necessary, the sleeves 28 will be moved inwardly due to the engagement of their flanges 37 in the track 38.

The angles 39 forming the tracks 38 are suitably supported by arms 41 extended inwardly from the sides of the framework 11 and inasmuch as the tracks 38 extend entirely around the structure the sleeves 28 and consequently their driving pins will be held in their proper positions to insure the engagement of the pins with the chains at all times except when it is necessary to move the same inwardly of the adjacent inner chain. During the vertical movement of the platforms at each end of the structure their weight is supported entirely by the chains, but as only two platforms are thus supported at one time, one moving up and the other down, no excessive strain is placed on the chains.

To permit the passage of the shafts 25 of the platforms at the forward upper left hand corner (see Figure 1), which at that point trail behind the shafts 27, the extended end of the adjacent track 18 is cut away, as at 42. At the opposite side, the track 17 is cut away, as at 43, which permits the passage of the shafts 27, which being directly opposite the shafts 25 are the trailing support at that side. At the lower forward left end of the device the inclined portion 23 of the track 19 is cut away, as at 44, to permit the passage of the shafts 25 and at its opposite side the inclined portion 24 of the track 20 is cut away, as at 45, to permit the passage of the shafts 27. At the other lower end of the structure and at the forward side thereof, the inclined portion 24 of the track 20 is cut away, as at 46, to permit the passage of the shafts 27 and on the opposite side the inclined portion 23 of the track 19 is cut away, as at 47, to permit the passage of the shafts 25. At the same end of the device but at the upper level, on the forward side, the track 17 is cut away, as at 48, to permit the passage of the shafts 27 and at the opposite side the track 18 is cut away, as at 49, to permit the passage of the shafts 25. As the length of the cuts in the tracks just described need be only sufficiently large to permit the shafts 25 and 27 to pass therethrough and as the diameter of the wheels 15 and 16 is comparatively larger than that of the shafts, the presence of the cuts does not affect the movement of the platforms.

From the foregoing description, taken in connection with the accompanying drawings, it will be seen that during the major portion of the movement of the platforms, the weight thereof is supported by the tracks 9 and 10, and that during their movement over the inclined portions the weight is supported by the tracks 17 and 18 at the upper level and 19 and 20 at the lower level. The ony time the chains support the weight of the patforms is during the up and down movements, and as only two platforms are so supported, at a time, no excessive strains are imposed upon the chains. It will also be readily apparent that any number of units, complete in themselves may be arranged side by side so that vehicles may be driven from one to another and in this manner entire floors of buildings may be utilized.

Furthermore, it will be readily apparent to those skilled in the art to which an invention of the character described appertains, that we provide an improved device for parking vehicles and the like which utilizes the weight of the vehicles and of the mechanism to assist the driving means thereof and which is particularly adaptable for making available, space in buildings, which otherwise is useless for parking purposes.

We claim:

1. In a device of the character described, platforms adapted to receive vehicles disposed on superimposed levels, means for readily movably supporting the platforms on said levels, and means connected with the platforms at spaced points and in substantially axial alignment with said supporting means to connect the platforms with each other to form substantially continuous and unbroken floors one above the other and whereby they may be moved from one level to another.

2. In a device of the character described, a plurality of platforms adapted to receive vehicles, means supporting the platforms side by side on two levels, and endless chains connected with the platforms at four points for moving the same along said levels and from one level to the other.

3. In a vehicle handling device of the character described, a plurality of platforms, means mounting the platforms for movement along substantially horizontal and vertical stretches, said platforms forming substantially continuous unbroken floors when in their horizontal stretches, and flexible driving means connected with the platforms at four points for moving the same.

4. A vehicle handling device of the character described, comprising a plurality of platforms arranged on superimposed levels to form substantially superimposed continuous unbroken floors, means connected with the platforms at four points for moving them from one level to another, and means whereby the platforms are spaced one above the other during movement from one level to another.

5. A vehicle handling device of the character described, comprising substantially horizontal stationary guideways disposed one above the other with their ends inclined inwardly toward each other but separated, a plurality of platforms adapted to receive vehicles and movable along said guideways, and means connected with the platforms for moving them along the guideways and from one guideway to the other and vice versa, said means being connected with the platforms at a plurality of points at each end of the platforms whereby, when on the substantially horizontal portion of the guideways the platforms engage each other to form unbroken superimposed floors and when moving up and down their inclined portions and from one guideway to another they are vertically spaced and securely held against tilting, the vertical space between successive platforms increasing and decreasing during movement over the inclined portions and being sufficient to accommodate the height of the vehicles thereon during transfer from one guideway to the other.

6. A vehicle handling device of the character described, comprising superimposed rigid elongated guideways having inclined substantially straight ends, platforms adapted to receive vehicles, means freely movably supporting the platforms on the guideways with their sides in engagement to form continuous unbroken superimposed floors, and driving means connected with the supporting means of the platforms for moving them along the guideways and from one guideway to another and vice versa, the manner of connecting the drive means with the platforms cooperating with the inclined ends of the guideways to space the platforms vertically during movement over the inclined ends of the guideways and from one guideway to the other and vice versa.

7. A vehicle handling device of the character described, comprising superimposed rigid guideways, a plurality of platforms adapted to receive vehicles, spaced means at each end of the platforms for freely movably supporting the same on the guideways with their side edges adjacent to form substantially continuous unbroken superimposed floors, means at the ends of the guideways for gradually changing the direction of movement of the platforms from horizontal to vertical and vice versa whereby—in transferring—they are vertically spaced to accommodate the height of a vehicle thereon, and means connected with the platforms at points substantially in alignment with the spaced supporting means at each end of the platforms for moving the platforms.

8. In a vehicle handling device of the character described, superimposed substantially horizontal guideways, platforms adapted to receive vehicles, means freely movably supporting the platform on the guideways, means connecting the platforms so that their side edges engage to form superimposed continuous and unbroken vehicle supporting floors, and means for transferring the platforms from one guideway to the other and vice versa including inclined straight portions at the ends of the guideways, whereby the platforms move vertically with respect to each other until they are spaced sufficiently to accommodate the height of the vehicles thereon, and whereby they are maintained out of vertical alignment until said vertical spacing is attained.

9. In a vehicle handling device of the character described, stationary guideways arranged on superimposed levels, platforms freely movable over the guideways, driving means connecting the platforms for moving them along the guideways and from one guideway to the other, the platforms engaging each other when on the guideways to form superimposed continuous and unbroken floors, and substantially straight inclined portions at the ends of the guideways whereby the direction of motion of the platforms is gradually changed from horizontal to vertical and vice versa and whereby the weight of the platforms is wholly supported by the driving means for only a portion of the movement from one level to another.

10. A vehicle handling device of the character described comprising separated stationary guideways arranged on superimposed substantially horizontal levels, platforms freely movable along the guideways and from one guideway to the other and vice versa, said platforms being closely adjacent each other when on the guideways to form superimposed substantially continuous and unbroken floors, and driving means connected with the platforms at four points whereby the platforms are held against tilting by the driving means during their transfer from one guideway to the other.

In testimony whereof we have hereunto affixed our hands.

FRANK C. WACHS.
ALFRED E. BUEROSSE.